United States Patent
Friel, Sr. et al.

(10) Patent No.: US 8,124,917 B2
(45) Date of Patent: Feb. 28, 2012

(54) ACCURATE TEMPERATURE MEASUREMENT IN HOUSEHOLD KETTLES

(75) Inventors: Daniel D. Friel, Sr., Greenville, DE (US); James Fitzgerald, West Chester, PA (US); Daniel D. Friel, Jr., Kennett Square, PA (US)

(73) Assignee: Edgecraft Corporation, Avondale, PA (US)

( * ) Notice: Subject to any disclaimer, the term of this patent is extended or adjusted under 35 U.S.C. 154(b) by 357 days.

(21) Appl. No.: 12/432,229

(22) Filed: Apr. 29, 2009

(65) Prior Publication Data

US 2009/0272730 A1 Nov. 5, 2009

Related U.S. Application Data

(60) Provisional application No. 61/049,810, filed on May 2, 2008.

(51) Int. Cl.
*F27D 11/00* (2006.01)
*A47J 31/00* (2006.01)

(52) U.S. Cl. ........ 219/439; 219/429; 219/430; 219/432; 219/433; 219/438; 219/214; 219/442; 99/280; 99/279; 99/281; 99/288; 99/285

(58) Field of Classification Search .............. 219/429, 219/430, 432, 433, 438, 439, 214, 442; 99/279, 99/280–1, 288, 285
See application file for complete search history.

(56) References Cited

U.S. PATENT DOCUMENTS

| | | | |
|---|---|---|---|
| 3,279,351 A | 10/1966 | Cohn | |
| 4,401,014 A | 8/1983 | McGrail | |
| 4,544,830 A | 10/1985 | Miller | |
| 5,862,738 A | 1/1999 | Warne | |
| 6,135,010 A | 10/2000 | Husted | |
| 6,240,833 B1 | 6/2001 | Sham | |
| 7,279,660 B2 | 10/2007 | Long | |
| 2003/0025093 A1* | 2/2003 | Kenny et al. | 251/11 |
| 2006/0124628 A1 | 6/2006 | Long | |
| 2007/0278202 A1* | 12/2007 | Long et al. | 219/214 |

FOREIGN PATENT DOCUMENTS

| | | |
|---|---|---|
| DE | 19706523 | 8/1998 |
| EP | 1767128 | 3/2007 |
| WO | WO 00/40128 | 7/2000 |
| WO | WO 01/28294 | 4/2001 |

* cited by examiner

*Primary Examiner* — Shawntina Fuqua
(74) *Attorney, Agent, or Firm* — Connolly Bove Lodge & Hutz LLP

(57) ABSTRACT

A vessel for preparing heated water or other liquid includes a container, an electric heater and a temperature sensing probe mounted through a wall of the container. The probe includes an efficient heat transferring structure in direct thermal contact with and wet by the liquid. An electrical sensor within the probe is in intimate thermal contact with the transferring structure and has electrical properties directly correlating with the temperature of the transferring structure. The transferring structure is attached to a supporting structure mounted to the wall by an elastomeric efficient thermal insulating material held in compression providing physical support for the probe and sealing the wall from leaking and insuring that the sensor is primarily thermally responsive to the temperature of the transferring surface and to the liquid but is thermally insulated from variations in the temperature of the supporting wall.

9 Claims, 2 Drawing Sheets

ACCURATE TEMPERATURE MEASUREMENT IN HOUSEHOLD KETTLES

CROSS-REFERENCE TO RELATED APPLICATION

Figure 1:
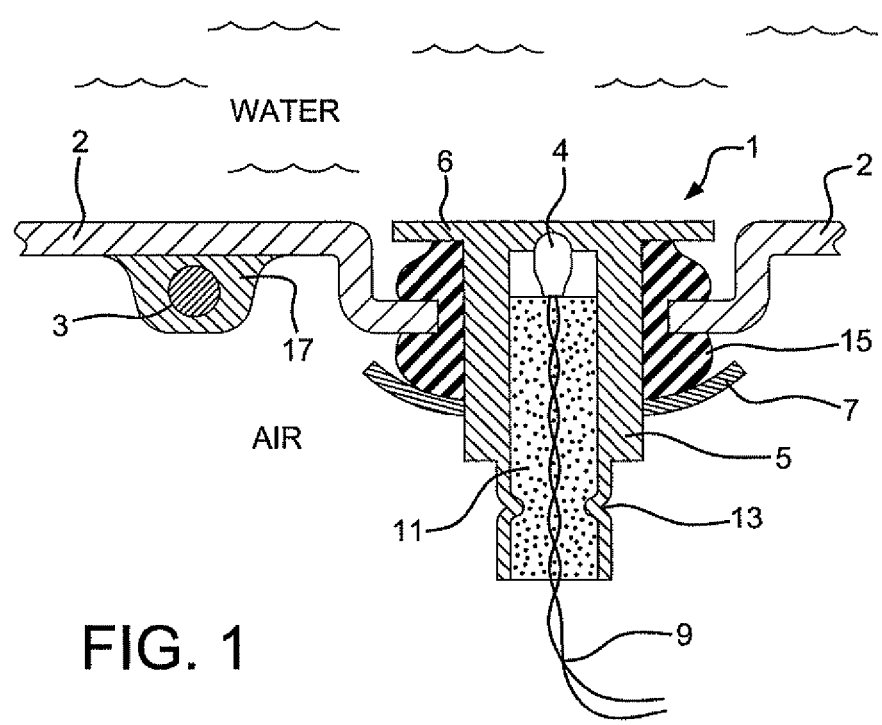

This application is based upon provisional application Ser. No. 61/049,810 filed May 2, 2008, all of the details of which are incorporated herein by reference thereto.

BACKGROUND OF THE INVENTION

This application discloses an advanced highly precise temperature measuring probe for use in household electric water kettles including those commonly used to heat water and water containing foods. There is now an increasing interest in heated kettles that can prepare warmed or hot water or other liquids at accurately selected and controlled temperatures. This is important to both tea and coffee drinkers who want to steep the tea or brew the coffee at a carefully selected temperature for optimum extraction and the best tasting beverage. Green teas for example are generally preferred if extracted around 140 degrees Fahrenheit. Black teas are better if brewed near the normal boiling point of water over 200 degrees.

Domestic kettles for heating and boiling water have not been available with a sufficiently precise means to measure or display the water temperature. In recent years one commercial kettle has been offered with a very rudimentary temperature controller that could be set to maintain the water temperature in such kettles, but only within a range which might be as large as ±10 degrees Fahrenheit. These have proven inadequate because their accuracy did not meet the needs of the discriminating tea and coffee drinkers. Generally the connoisseur wants to preset the temperature accurately to ±2° Fahrenheit and to have the water held at the selected temperature until it is convenient to prepare the beverage or food. These inventors are not aware of any commercial household kettle that meets these needs. One of the main reasons that commercially available kettles have failed to provide the necessary accuracy is the lack of a practical compact thermal probe in which to mount a thermal sensor that can sense very accurately the water temperature. There is no shortage of electrical thermocouples, thermostats and other temperature sensors that produce an electrical signal that reflects their temperature with more than needed accuracy and reproducibility. The unfilled need has been for a thermal probe of a practical design to house the sensor that can be placed in physical and thermal contact with the heated liquid, such as water, that is not physically intrusive within the kettle, which is supported in a manner that is not responsive to the ambient air temperature, to the extremely high temperature of the kettle heater, the temperature of its supporting plate or to the temperature of the kettle body and operating parts. All existing thermal probes for kettles known to these inventors were unsatisfactory for one or more of these stated reasons.

SUMMARY OF THE INVENTION

An object of this invention is to provide structure for the accurate temperature measurement in household kettles.

In accordance with this invention a temperature sensing probe is mounted through a wall or base of a container and includes heat transferring structure in direct thermal contact with and wet by the liquid based material inside the container. An electrical sensor within the probe is in intimate thermal contact with the heat transfer structure. The sensor has electrical properties which directly correlate with the temperature of the heat transferring structure. The heat transferring structure is attached to a supporting structure mounted to the base by an elastomeric efficient thermal insulating material held in compression to provide physical support for the probe and to seal the wall from weeping so as to insure that the sensor is primarily thermally responsive to the temperature of the heat transferring structure and to the liquid, but is thermally insulated from variations in the temperature of a supporting wall or base.

THE DRAWINGS

Figure 2:
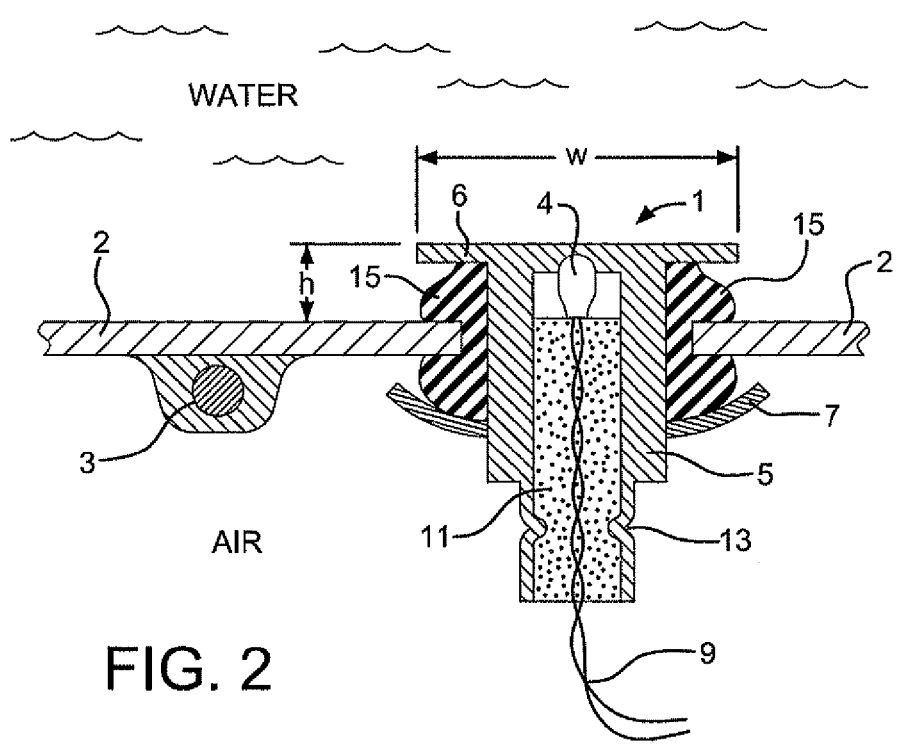
Figure 3:
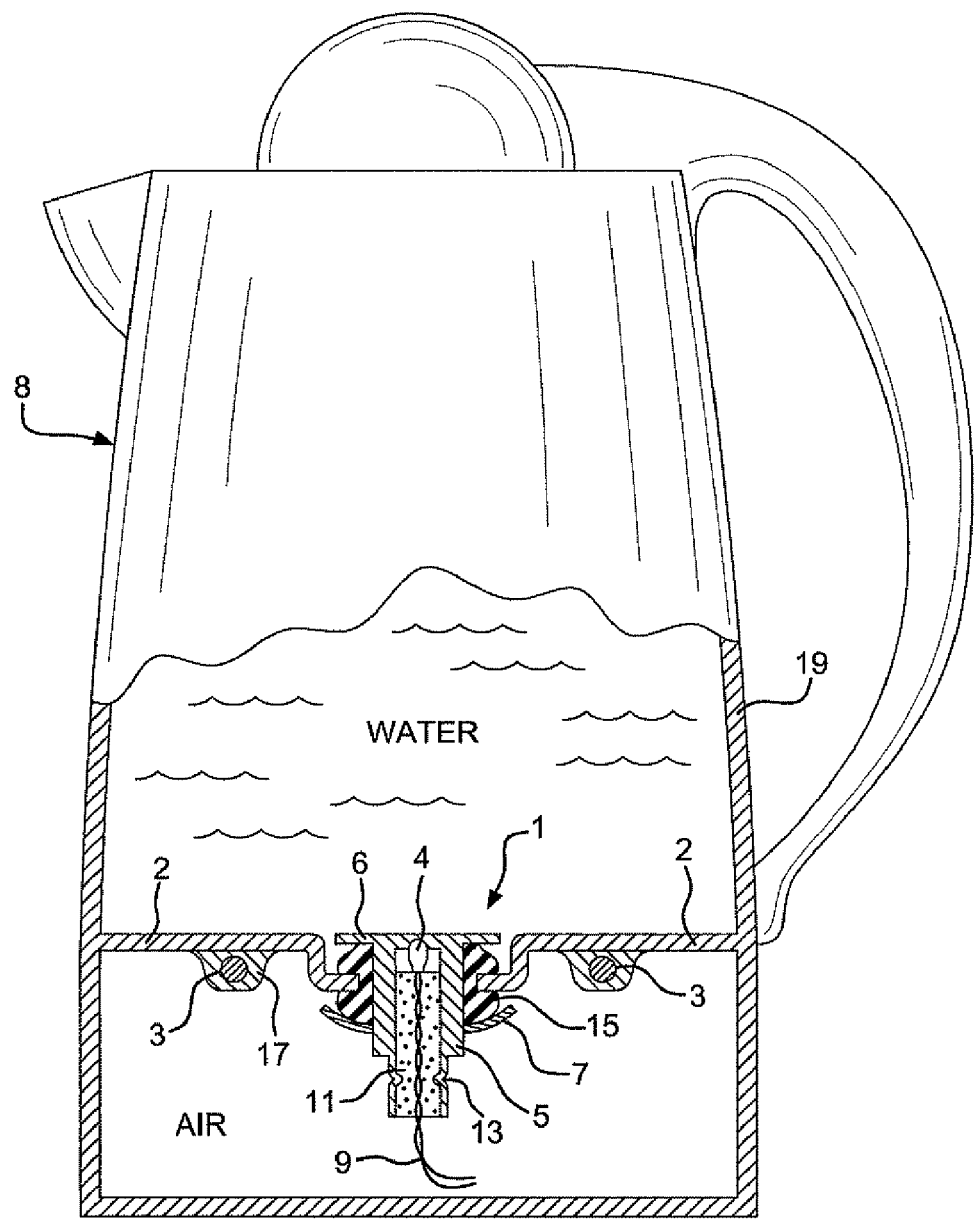

FIGS. 1-2 illustrate the general structure for the temperature sensing probe; and FIG. 3 shows a kettle incorporating the probe of FIGS. 1-2.

DETAILED DESCRIPTION

The subject of this invention is a specialized thermal probe that can unobtrusively measure accurately the temperature of the water or other liquid in an electrically heated water kettle. Conditions common to such kettles require a unique probe design that first needs to nominally conform to the shape of the interior wall of its kettle.

In modern electric water kettles it would be unacceptable to have a conventional industrial type thermal probe that would project deeply inside the kettle wall and interfere with the use of any manual means to mix or stir the liquid. Further it is highly desirable that any thermal probe be located on the bottom plate of the kettle where it will be readily accessible to a hand reaching inside the kettle for cleaning. However the task is severely complicated by the fact that the high temperature, high wattage (1500 watt) heaters for such electric kettles are also mounted on the bottom of the kettle. Such powerful heaters are usually mounted on the underside of the metal plate which constitutes the bottom of the kettle. The body of the kettle can for example be made either of metal joined integrally with the heater plate or of glass which can be fastened to the heater plate with a high temperature bonding agent.

The heater plate of today's powerful electric water kettles may be only 4 or 5 inches in diameter and must support in addition to an extended electric heater, a variety of switches and controls. There is consequently very little space for a temperature probe. Thus of necessity any location or space on that plate available to mount a thermal probe must be extremely close physically to the 1500 watt heater, on the order of less than an inch. Because of the proximity of the high temperature heater and the requirement to measure water temperature accurately to ±1 degree centigrade (±2° Fahrenheit) a highly unique design is necessitated. The heater must be sufficiently powerful to rapidly heat its support plate substantially above 212° F. and to efficiently boil the water on the upper side of that plate. Consequently the design of a thermal probe mounted on the heater plate must be unique in order to sense precisely the water temperature over the range from about 60° F. to 212° F. without interference from the very hot and immediately adjacent electrical heater.

The temperature measuring probe of this invention uniquely overcomes the problems of prior temperature measuring means used for heating water and water based foods in electrically heated household kettles. The dimensionally small probe of this invention conforms without practical obstruction to the nominal internal contour of the kettle allowing free movement of water, other liquids, or food within the kettle or similar heated vessel. It is designed to optimize thermal contact with the liquid and to minimize the thermal influence of the adjacent heater, the kettle walls, the ambient air or steam/air temperatures within the kettle body or cavities. This is in sharp contrast to prior art thermal probes that extend deeply into the water or liquid space and seriously interfere with an ability to manually stir or mix liquid within the kettle. Prior art thermal probes for measurement of temperature of liquid in containers are relatively long small diameter tubes deliberately located remotely from the heater and deeply immersed within the liquid. Such tubes because of their length and large aspect ratio, can be adequately precise although supported in firm physical and thermal contact with the container wall, because the wall at their location is at the same temperature as the liquid. The accuracy of temperature measurements under such normal conditions can be very high as the thermal sensor is mounted at the extreme end of its long mounting tube which is immersed in a liquid of relatively uniform temperature fastened to and supported by a wall all at about the same temperature.

Thermal conditions in a small household kettle commonly are neither static or slowly changing, rather the thermal conditions are very dynamic. The kettle is relatively small, commonly powered by a 1.5 kilowatt heater mounted in good direct thermal contact with the base of the kettle that must heat water in the vessel from room temperature to boiling in just a few minutes. For this reason the sensing means for measuring the water (liquid) temperature throughout the range 70 to 212° F. must be able to respond both rapidly and accurately to the changing temperature of the water, and yet not be adversely affected by heat from the adjacent electric water heater which may have an exterior wall temperature above 300° F. and located within one (1) inch of the temperature measuring probe.

The kettle base plate which serves as the supporting and heat transferring plate for the heater is perhaps the most convenient place to mount the thermal probe but it is also the most hostile environment whenever the power heater is energized. There is however an important advantage of mounting the thermal probe at this location because of the opportunity to sense quickly changes in water temperature immediately adjacent to that heater plate and thereby anticipate the temperature rise in the main volume of water. This ability to anticipate temperature changes allows related electronic controls to maintain closer control of the water temperature at the set temperature and to stabilize the temperature controlling function. For the reasons cited this is an advantageous, uncommon, but difficult environment in which to measure the water temperature accurately. However our unique compact probe design has been shown to virtually eliminate thermal interference by the adjacent electric heater and allows the user to stir the liquid without interference because of the small size of the temperature measuring probe.

What we have developed is a unique low profile thermal probe which has rapid thermal response as the water heats and can measure the water temperature accurately to within ±2° centigrade. This design is being incorporated in the design of commercial kettles that hold up to 2 liters of water powered with a 1500 watt heater.

This invention incorporates some of the techniques described in U.S. Pat. No. 7,279,660 and co-pending application Ser. No. 11/842,367, filed Aug. 21, 2007, all of the details of which are incorporated herein by reference thereto.

FIGS. 1 and 2 illustrate in a general way the design of this new temperature sensing element. As illustrated in FIG. 3, the probe 1 is mounted in the base plate 2 of the kettle 8 in close proximity to the powerful 1500 watt heater 3 that is also mounted on the same base plate. This probe design, although uniquely designed for the hostile environment of the heater plate, can be readily mounted in other positions thru the kettle wall 19 where it would remain wholly immune to the varying high temperatures of the electric heater on the supporting base plate. As illustrated the base plate 2 separates the water or liquid chamber above the base plate from the air chamber below the base plate.

This novel temperature sensing probe as described here and shown in FIG. 1 is designed with an efficient heat transferring structure 6 in contact with the liquid which conforms in shape nominally to the shape of the base heater plate 2 adjacent the probe. As shown in FIG. 1 the heater support plate 2 is usually flat. The heat transferring structure 6 is generally in line with the base plate 2. The non-protruding surface of the efficient heat transferring structure 6 will not interfere with stirring when that is needed. FIG. 2 shows a slightly modified probe 1 with the heat transfer structure 6 mounted just above the inner face of the base plate 2. This alternative allows water to circulate more freely around the heat transfer surface for slightly greater accuracy and faster response to changes in water temperature but is not quite as convenient for stirring. This variation would be very effective at any location in the wall of the kettle so long as its slightly higher profile does not interfere with stirring.

The efficient heat transferring structure 6 is attached to the supporting structure 5. The support 5 can be made entirely of the same material used for the efficient heat transferring structure 6, for example aluminum, copper, or other good conductor of heat. Alternatively the heat transferring structure 6 can be insert molded onto a poor heat conducting plastic, for example, that would provide support for the plate but minimize heat transfer through the supporting structure 5.

The actual electrical temperature sensor 4 can be, for example, a thermistor or a thermocouple whose known electrical properties as related to temperature are monitored by appropriate electronic circuits through the attached electrical conducting leads 9. The sensor 4 must be in good thermal contact with the heat transferring structure plate 6 made of the efficient heat transferring material in wetted contact with the water. In FIGS. 1 and 2 the sensor 4 is shown held against structure plate 6 by a slightly elastic thermally insulating material 11, such as silicone or an insulating silicone foam that is in this example held in place by crimping of the supporting structure 5 at position 13. The sensor 4 can of course be held in position by a spring or means other than silicone or silicone foam which would maintain the sensor 4 in good physical and thermal contact with the structure plate 6 so that it can quickly assume the temperature of the water.

It is critical to the thermal performance of this probe to provide good efficient thermal insulation 15 between all parts of the probe and the heated kettle base plate 2 which supports the electrical heater 3. The heater is commonly mounted to the base plate 2 with a good thermal conducting material 17, such as an alloy of aluminum.

The accuracy of the novel thermal probe 1 depends first upon the intimate thermal contact between the sensor 4 and the efficient heat transfer structure 6 which is in itself in good thermal contact with the water. The heat transfer between the heated water or other liquid material in the kettle is extremely good because of the high turbulence and agitation in that liquid close to the hot surface of the heater plate 2. While counterintuitive, and described above, this is the best location in the kettle to optimize heat transfer between the heat transferring structure 6 and the liquid. The heat transfer coefficient at that location between the water and structure 6 can be extremely high on the order of 150 BTU/hr/sq.ft/° F. The design, however, depends also on a highly effective insulating material between the probe 1 and the adjacent base heater plate 2 in order to minimize the amount of heat transferred to the probe from that plate. Silicone rubber, one material that can be used as a thermal insulator, can have a very low coefficient of heat transfer on the order of 0.1 BTU/hr./sq.ft/° F. The only other source of heat that might reach the efficient heat transfer structure 6 and sensor would be from ambient heated air in the compartment on the underside of the heating plate 2. The heat transfer coefficient for the interface between the heated air and the probe support structure 5 is in the order of 2 BTU/hr./sq.ft./° F. It is evident therefore that the heat transfer coefficient from the water to the efficient heat transfer structure 6 is uniquely much greater than the coefficients controlling heat flow to the probe from the base plate thru the insulation or from the heated air surrounding the supporting structure 5. Consequently the water temperature can be measured with great accuracy so long as the relative surface area of the efficient heat transferring structure 6 is adequate in size to absorb sufficient heat to overcome the smaller amount of heat transferred from other sources. That surface area appears adequate, if circular, about 0.8 inch diameter with the electrical sensor in the center of the thin walled circular structure. That diameter corresponds to a heat transfer area in contact with the water of about 0.5 square inches. Further if the supporting structure 5 of the probe 1 is made of a low thermal conductivity plastic-like material, such as nylon, the amount of heat flow in a given time period from the heater plate and the heated ambient air to the efficient heat transferring structure 6 and to the sensor itself can be greatly diminished and become truly diminemous in view of the extraordinary high transfer from the vigorously moving water adjacent the heater plate interface with the water.

We have demonstrated that when using aluminum both as the efficient heat transfer structure 6 and for the supporting structure 5, with silicone insulators 15, the probe designs of FIGS. 1 and 2 permits temperature measurements and control of domestic kettles to within ±2° centigrade. The dimensions and total area of the efficient heat transfer structure must be carefully considered in order to maximize the amount of heat (and heat transfer) transmitted to the detector 4 from the heated water and to minimize the relative amount of heat transmitted from the heated kettle base plate 2. The need that the probe have a low profile and conform as much as practical to the shape of the kettle's inside surface constrains the shape of the efficient heat transfer structure to a very small aspect ratio (ratio of height above the mounting surface to width of heat transfer structure in contact with the water.) When the conformity to the interior wall surface is perfect, the aspect ratio is of course zero (0).

The speed of response of the thermal probe described here is dependent on the thermal mass (or heat capacity) of the key components of the probe. The thickness of the efficient heat transfer structure 6 at the point of contact with the sensor 4 should be as small as practical on the order of 0.065 inch or less. The overall mass of the remainder of the probe should be otherwise minimized particularly if it is not made of plastic.

The thermal sensor 4 should contact the heat transfer structure 6 near the center of that structure as shown in FIGS. 1 and 2. The sensor should be spaced away from the support structure 5 as shown in order that its temperature is controlled by structure 6. The adverse effect of extraneous sources of heat such as from the base plate 2 and the ambient air outside the kettle is greatly reduced by insuring a sufficient length and area of the efficient heat transfer structure 6 in all directions (parallel to the mounting plate surface) around the point of contact with the thermal sensor 4. Structure 6 is of course in intimate contact with the water on its top side. A length of the efficient heat transfer structure in the water on the order of 0.4 inch in all directions from the central location above the sensor 4 parallel to the mounting plate has proven adequate even with the probe 1 constructed entirely of aluminum.

The aspect ratio (ratio of height (h) (FIG. 2) above vessel mounting surface to width (w) of the probe structure in liquid) of prior art common tubular thermal probes is generally much greater than one. By contrast the probe of FIGS. 1 and 2 have proven very accurate even with an aspect ratio much less than one, approaching zero. The wall thickness of structural member 5 that supports the efficient heat transfer structure 6 as shown in FIGS. 1 and 2 can be reduced sufficiently to virtually eliminate heat transfer from the heater plate to the heat transfer surface 6. Such reductions also improve the thermal response time of the probe. Additional thermal insulation (not shown) can be added around the exterior of structure 5 to reduce any thermal heat transfer from the heated air that surrounds that structure during the water heating cycle. The use of such insulation improves further the overall accuracy of the measured temperature of the water in the kettle. The insulating material 15 between the kettle base and the probe is sufficiently elastic that a push nut 7 or other means can be used to compress that material enough to insure a water tight seal between the probe and the kettle base. The push nut 7, once pushed on, will sufficiently gouge into the supporting structure 5 to resist subsequent removal. This arrangement provides both a water tight seal and a sturdy physical connection to and support by the kettle base. The insulating material need not be highly elastic but it should be sufficiently compressible to realize a water tight seal. It is important that neither the supporting nut 7 or the probe support structure 5 make direct physical or thermal contact with the heater plate 2. The efficient heat transfer surface 6 is as described preferably larger and extended beyond the supporting structure 5 in order to maximize the surface area of heat transfer surface 6 in actual contact with the liquid and similarly to minimize the thermal heat transfer from the supporting structure 5 to structure 6.

What is claimed is:

1. A vessel for preparation of heated water or other liquid based beverage or food comprising a container for the liquid, an electric heater for the liquid in said container, and a temperature sensing probe mounted through a wall of said container, said probe comprising an efficient heat transferring structure in direct thermal contact with and wet by the liquid based material inside said container, an electrical sensor within said probe in intimate thermal contact with said efficient heat transfer structure and whose electrical properties directly correlate with the temperature of said heat transferring structure, where said heat transferring structure is attached to a supporting structure that is mounted to said wall by an elastomeric efficient thermal insulating material held in compression to provide physical support for said probe and to seal said wall from leaking and to insure that said sensor is primarily thermally responsive to the temperature of said heat transferring surface and to the liquid but thermally insulated from variations in the temperature of said supporting wall of the container.

2. A vessel according to claim 1 where said efficient heat transferring structure in contact with the liquid based material is contoured or shaped to conform to the interior shape of said vessel at that location.

3. A vessel according to claim 1 where the thickness of said heat transferring structure in direct contact with the liquid based material is less than 0.060 inches and the area of said efficient heat transferring structure is greater than 0.5 sq. inches.

4. A vessel according to claim 1 where the portion of the temperature sensing probe extending beyond said vessel wall within the liquid space has a height to width aspect ratio within said vessel of essentially zero.

5. A vessel according to claim 1 where that portion of said temperature sensing probe extending outside the liquid space is thermally insulated from said supporting wall, the base of the vessel and the ambient air outside the liquid space.

6. A vessel according to claim 1 where said vessel is a kettle, said wall being a base plate of said kettle separating a liquid chamber above said base plate from an air chamber below said base plate.

7. A vessel according to claim 6 where said heat transferring structure is generally in line with said base plate.

8. A vessel according to claim 6 wherein said heat transferring structure protrudes above said base plate.

9. A vessel for preparation of heated water or other liquid based beverage or food comprising a container for the liquid, an electric heater mounted on or within a metallic base plate of said container, and a temperature sensing probe mounted on said base plate immediately adjacent said heater protruding through said base of said container, said probe comprising an efficient heat transferring structure in thermal contact with the liquid based material inside said container, an electrical sensor within said probe in intimate thermal contact with said heat transfer structure and whose electrical properties directly correlate with the temperature of the heat transferring structure and an attached supporting structure for said efficient heat transferring structure where said supporting structure is made of a poor heat conducting material so that the heat transferred to the efficient heat transferring structure is primarily from the temperature of the liquid and not due to the temperature of the supporting wall, the base of the vessel or the ambient air.

\* \* \* \* \*